United States Patent [19]

Chao et al.

[11] Patent Number: 6,044,391

[45] Date of Patent: Mar. 28, 2000

[54] METHOD OF GENERATING THE STICKY-BIT FROM THE INPUT OPERANDS

[75] Inventors: Chin-Chieh Chao, I-Lan, Taiwan; Paul Jeffs, Sunnyvale, Calif.

[73] Assignee: Sun Microsystems, Inc., Palo Alto, Calif.

[21] Appl. No.: 08/883,119

[22] Filed: Jun. 25, 1997

[51] Int. Cl.[7] .................................................. G06F 7/38
[52] U.S. Cl. ................................................... 708/499
[58] Field of Search ........................... 364/748.05, 748.09

[56] References Cited

U.S. PATENT DOCUMENTS

| H1222 | 8/1993 | Brown et al. ................. 364/748.05 |
| 4,928,259 | 5/1990 | Galbi et al. .................. 364/748.05 |

OTHER PUBLICATIONS

Brent, Richard P. and Kung, H. T., "A Regular Layout for Parallel Adders" *IEEE Transactions On Computers* vol. C–31:260–264 (1982).

Santoro, Mark R. et al., "Rounding Algorithms for IEEE Multipliers" 176–183 *Proceedings of the 9th Symposium on Computer Arithmetic* (1989).

Yu, Robert K. and Zyner, Gregory B., "167 MHz Radix–4 Floating Point Multiplier" *Proceedings of the 12th Symposium on Computer Arithmetic* (1995).

"IEEE Standard for Binary Floating–Point Arithmetic", *ANSI/IEEE Std* 754–1985, New York, The Institute of Electrical and Electronic Engineers, Inc., (1985).

UltraSPARC™ Programmer Reference Manual, Rev. 1.0, Sun Microsystems, Inc., p. 237 (1995).

*Primary Examiner*—Tan V. Mai
*Attorney, Agent, or Firm*—The Gunnison Law Firm

[57] ABSTRACT

A method for generating the sticky-bit includes encoding the first operand to represent the number of trailing zeros in the first operand. Then the second operand is encoded to represent the number of trailing zeros in the second operand. The encoded values are then added together to form a sum representing the number of trailing zeros in the multiplication result. The sum total number of trailing zeros is then compared to a predetermined constant. The constant is equal to the number of bits used in determining the sticky-bit. If the sum is larger than the constant, then the sticky-bit is given a value of zero and, conversely, if the sum is smaller than the constant, the sticky-bit is given a value of one.

2 Claims, 7 Drawing Sheets

105      77 76              29 28            Ø
RESULT|Ø|Ø|•••|Ø|Ø|X|X|X|X|•••|X|X|Ø|Ø|•••|Ø|Ø|
```

METHOD OF GENERATING THE STICKY-BIT FROM THE INPUT OPERANDS

FIELD OF THE INVENTION

The present invention relates to floating-point multipliers and, more particularly, to methods for generating the sticky-bit of floating-point multiplication operations.

BACKGROUND

Many floating-point multiplier circuits used in high performance processors generate the "sticky-bit" to generate the rounding action of the raw result of the multiplication operation. The sticky-bit is defined to be equal to zero only if, in the raw result, the value of all of the bits to the right of the "round-bit" (i.e., the round bit is typically defined as the bit to the right of the least significant bit) are zero. As is well known in the art of binary floating-point multipliers, the sticky-bit is used to break a "tie" condition when the raw value is exactly half way between the rounded-up value and the rounded-down value. Consequently, if the sticky-bit is zero and the round-bit is one (i.e., the "tie" condition), then during the rounding action the least significant bit is incremented if the least significant bit is a one; otherwise, the raw result is truncated after the least significant bit. This definition of the sticky-bit stems from the "IEEE Standard for Binary Floating-Point Arithmetic", ANSI/IEEE Std 754-1985. In particular, the IEEE 754 Standard specifies that the default rounding mode is the "round to nearest", which is commonly referred to as the "round to nearest/even" because in a "tie" case (i.e., when the raw value is equally between the round up value and the round down value), the "round to nearest" mode specifies that the least significant bit shall be a zero (which makes the value "even" instead of "odd").

A typical process to perform the "round to nearest/even" action adds a ½ to the least significant digit of the raw multiplication result (i.e., a "round to nearest/up"), and truncates the remaining digits to the right of the least significant digit. Then, in this conventional process, the raw result is checked to detect whether a "tie" condition exists. If a "tie" condition exits, the least significant digit is set to zero. This conventional definition can be implemented in binary arithmetic by adding a one to the round-bit and then performing a logical-OR operation of all of the bits remaining to the right of the round-bit. The output bit of this logical-OR operation is called the sticky-bit. This definition is described in more detail by M. Santoro et al in "Rounding Algorithms for IEEE Multipliers", Proceedings of the 9th Symposium on Computer Arithmetic, September 1989, pp. 176–183, which is incorporated herein by reference.

In the following example, the IEEE 754 "round to nearest" mode is to be performed to round to the nearest $(2^{-2})$th bit on the raw binary number 0.101XXX (where each X represents a zero or a one). Accordingly, the least significant bit (LSB) in this example is the zero and the round bit is the zero next to the first X. Of course, the LSB can be rounded up to a one or else stay at zero, depending on the value of the bits (i.e., the Xs) to the right of the round bit. Using the "round to nearest/up" definition (i.e., incrementing the round bit), the correct "round to nearest/even" value is generated, except when all of the Xs are zero. More specifically, when all of the Xs are zero, the raw value is 0.101000. Using the "round to nearest/up" definition results in a rounded value of 0.11. However, the value 0.101000 is exactly between the possible rounded values of 0.11 and 0.10 and, thus, should be rounded to 0.10 using the "round to nearest/even" mode. Accordingly, to generate the correct rounding action, the condition in which all of the Xs are zero must be detected (which is the definition of the sticky-bit provided above).

Figure 1:
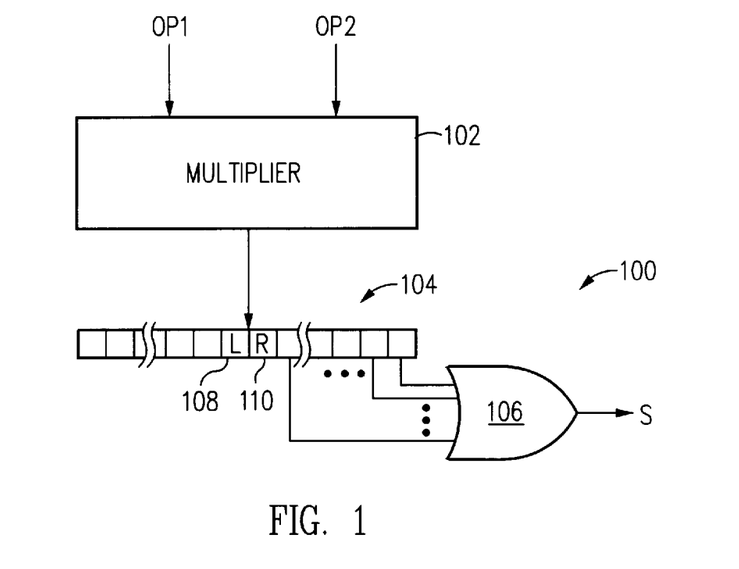
FIG. 1 is a diagram of a conventional sticky-bit detection circuit.

FIG. 1 is a diagram of a typical conventional circuit 100 to generate the sticky-bit. The circuitincludes a register 104 and an OR gate 106. The register 104 stores the LSB in a cell 108 and the round bit in an adjoining (to the right) cell 110. Generally, the register 104 stores several additional bits to the right of the round bit. The OR gate 106 is connected to receive all of these bits to the right of the round-bit in the resultant fraction generated by the multiplier circuit 102. Of course, the multiplier circuit 102 must first generate the raw multiplication result before the circuit 100 can generate the sticky-bit. Consequently, the sticky-bit generation is undesirably in the critical path of the multiplication operation, which detrimentally impacts the performance of the multiplier. Accordingly, there is a need for generating the sticky-bit without waiting for the raw multiplication result to be generated, thereby taking the sticky-bit generation out of the critical path.

SUMMARY

In accordance with the present invention, a method for generating the sticky-bit directly from the input operands is provided. In one embodiment, the method includes encoding the first operand to provide an encoded value representing the number of trailing zeros in the first operand. Similarly, the second operand is encoded to provide an encoded value representing the number of trailing zeros in the second operand of the multiplication operation. In a next step, the encoded values are added together, forming a sum representing the number of trailing zeros in the resultant of the multiplication operation. This sum is compared to a predetermined constant, the constant being equal the number of bits used in determining the sticky-bit. If the sum is larger than the constant, the sticky-bit is given a zero value and, conversely, if the sum is smaller than the constant, the sticky-bit is given a value of one. Thus, in this embodiment, signals of a first type (i.e., the input operands) are converted to a signal of a second type (i.e., the sticky-bit). Unlike conventional methods, this conversion is performed directly from the input operands, thereby taking the sticky-bit generation out of the critical path.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 2:
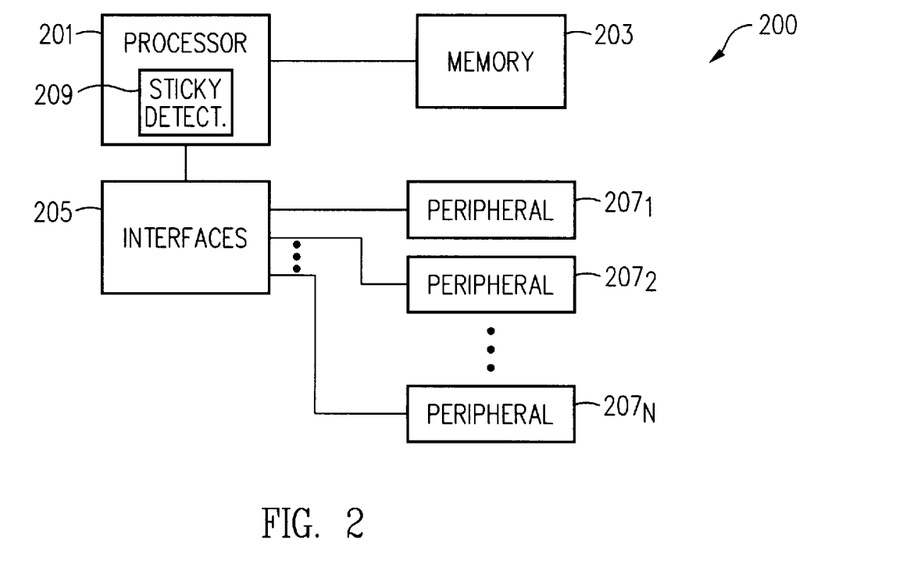
FIG. 2 is a block diagram of an electronic circuit having a sticky bit detection circuit according to one embodiment of the present invention.

FIG. 2 is a block diagram of an electronic system 200 according to one embodiment of the present invention. The electronic system 200 includes an integrated circuit 201, a memory 203, interfaces 205 and peripherals $207_1$-$207_N$.

The electronic system 200 can be any type of electronic system. In this embodiment, the electronic system 200 is a computer system in which the integrated circuit 201 is a processor connected to the memory 203 and to interfaces 205. The processor can be any type of processor such as, for example, Pentium®, X86, Sparc®, Alpha®, MIPS®, HP®, and PowerPC® processors. The interfaces 205 are connected to peripherals $207_1$-$207_N$, thereby allowing the processor to interact with these peripherals. The memory 203 and the interfaces 205 can be any type of memory or interface for use in computer systems. Likewise, the peripherals can be any type of peripheral such as, for example, displays, mass storage devices, keyboards or any other type of input or input-output device. In accordance with the present invention, unlike conventional processors, the integrated circuit 201 includes a sticky-bit detection circuit 209 that generates the sticky-bit directly from the input operands, thereby removing the sticky-bit generation from the critical path to increase the performance of integrated circuit 201.

Figure 3:
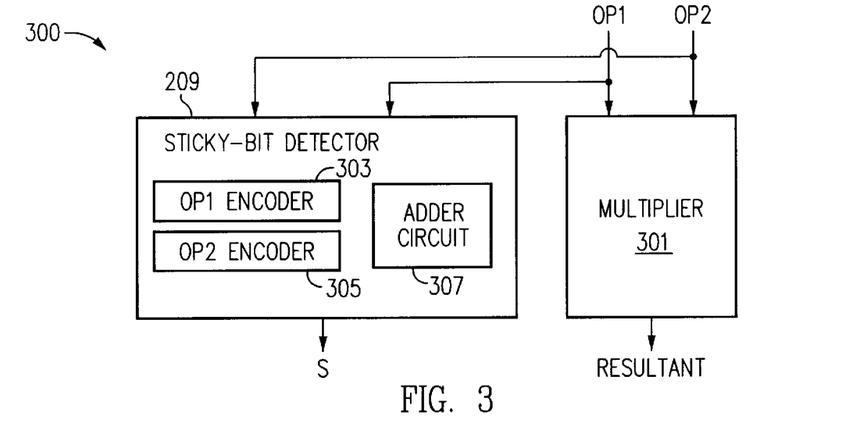
FIG. 3 is a block diagram of a multiplier circuit having a sticky-bit detection circuit according to one embodiment of the present invention.

FIG. 3 is a block diagram of a multiplier circuit 300 according to one embodiment of the present invention. In this embodiment, the multiplier circuit 300 includes the sticky-bit detection circuit 209 and a multiplier 301. The multiplier 301 can be any suitable multiplier. In this embodiment, the multiplier is a conventional multiplier of the type disclosed in "167 MHz Radix-4 Floating Point Multiplier", R. Yu and G. Zyner, Proceedings of the 12$^{th}$ Symposium on Computer Arithmetic, Jul. 19–21, 1995, which is incorporated herein by reference.

The sticky-bit detection circuit 209 includes a first encoder 303, a second encoder 305 and an adder circuit 307. The sticky-bit circuit 209 operates as follows. The encoders 303 and 305 are used for encoding the first and second operands OP1 and OP2 to be multiplied, respectively. In this embodiment, the operands are the least significant fifty-two bits of fifty-three bit double precision multiplication operands. The encoders, described below in conjunction with FIGS. 6 and 7, generate the number of trailing zeros of the operands OP1 and OP2 in binary form. The adder circuit 307 then adds the encoded operands and compares the sum to a constant. In this example, the constant is the number fifty-one in binary form, which represents the number of digits to the right of the round bit (see FIG. 1) for a 53-bit-by-53-bit multiplication operation.

In this embodiment, the sticky-bit definition uses a guard bit, as described in the aforementioned Yu and Zyner reference. By using a guard bit, the precision of the result is retained when the result must be left-shifted due to a leading zero. In this guard bit sticky-bit definition, a fifty-three bit-by-fifty-three bit multiplication generates a 106-bit resultant [105:0], of which the fifty-three most significant bits (MSBs), bits[105:53], are taken for the multiplication result, with bit[52] and bit[51] being the guard and round bits, respectively. Thus, the sticky-bit is the logical-OR of the lower order fifty-one bits (bits[50:0]). Accordingly, to generate the sticky-bit, the lower order fifty-two-bits of the fifty-three-bit operands are encoded (the MSB of the operands are implicit in many floating-point implementations). Because the sticky-bit is determined (i.e., the sticky-bit is zero) if one operand has fifty-one trailing zeros, other embodiments of the sticky-bit detection circuit can be implemented that encode only the lower order fifty-one bits of the operands. As described above, the sticky-bit is generated to properly round the least significant bit of the retained bits.

Because the sticky-bit is defined as the logical OR of the bits to the right of the round bit, then the sticky-bit is zero only when all of these lower order bits are zero. Thus, the sticky-bit is equal to zero only when the number of trailing zeros in the multiplication result is greater than or equal to the number of these lower order bits. Further, in binary multiplication, the number of trailing zeros in a multiplication result is equal to the sum of the trailing zeros of the operands. Thus, if the sum generated by the adder circuit 307 is greater than or equal to fifty-one, then the sticky-bit is set to zero. Conversely, if the sum of trailing zeros is less than fifty-one, the sticky-bit is set to one. Accordingly, the sticky-bit is generated directly from the operands OP1 and OP2 without the need for having the multiplication result, thereby taking the sticky-bit generation out of the critical path.

Although a sticky-bit definition using a guard bit in addition to the round bit is described, in light of this disclosure, those skilled in the art of sticky-bit circuits can implement without undue experimentation other embodiments of the sticky-bit detection circuit for use with other sticky-bit definitions. For example, the sticky-bit detection circuit can be adapted for the sticky-bit definition of the aforementioned Santoro reference (which uses a round bit but not a guard bit).

Figure 4:
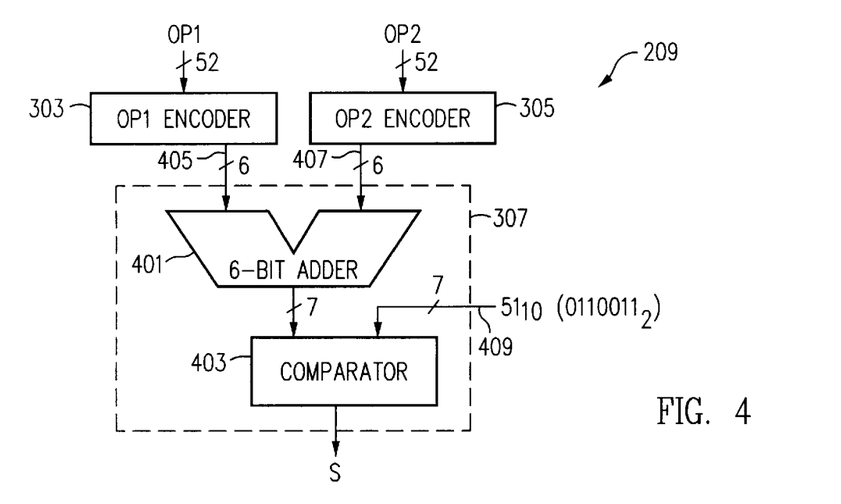
FIG. 4 is a block diagram of a sticky-bit detection circuit according to one embodiment of the present invention.

FIG. 4 is a block diagram of the sticky-bit detection circuit 209 (FIG. 3) according to one embodiment of the present invention. This embodiment is advantageously used in double precision multiplication operations (i.e., fifty-three-bit by fifty-three-bit multiplication). The sticky-bit detection circuit 209 includes the encoders 303 and 305 (as described above in conjunction with FIG. 3 and shown in more detail in FIGS. 6 to 8), and the adder circuit 307, which includes an adder 401 and a comparator 403.

This embodiment of the sticky-bit detection circuit 209 is interconnected as follows. The encoders 303 and 305 are respectively connected to receive the operands OP1 and OP2. The adder circuit 307 has an input port 405 connected to the output port of the encoder 303 and has an input port 407 connected to an output port of the encoder 305. More specifically, the six-bit conventional full adder 401 of the adder circuit 307 is connected to receive the six-bit encoded signals from the encoders. The output port of the full adder 401 is connected to an input port of the comparator 403. The comparator 403 has another input port connected to an input port 409 of the adder circuit 307 to receive a predetermined constant.

Figure 4A:
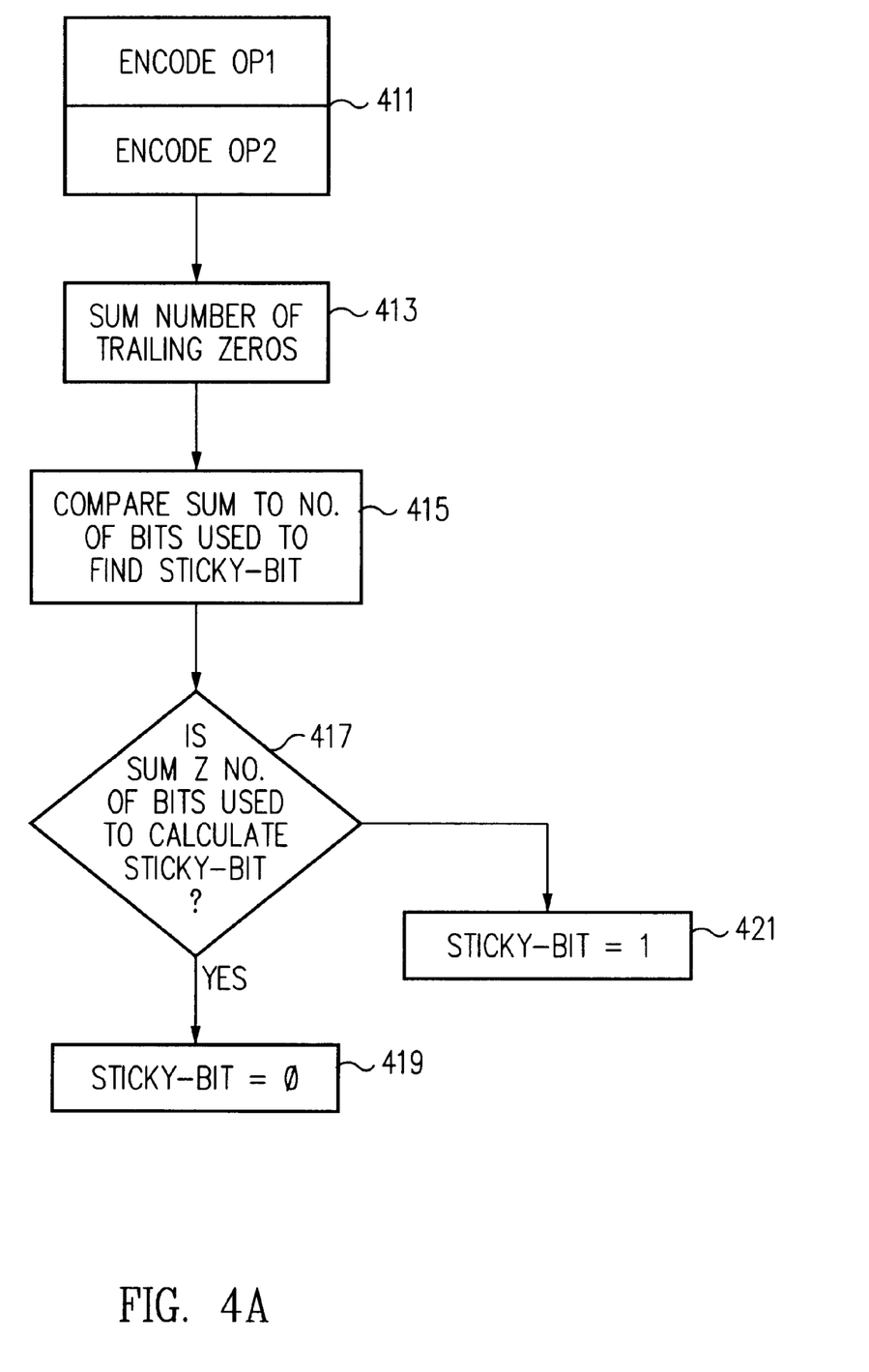
FIG. 4A is a flow diagram illustrative of the operation of the sticky-bit detection circuit of FIG. 4.

FIG. 4A is a flow diagram illustrative of the process used by the sticky-bit detection circuit 209 to generate the value of the sticky-bit. Referring to FIGS. 4 and 4A, the sticky-bit detection circuit 209 operates as follows. In an initial step 411, the encoders 303 and 305 respectively receive the operands OP1 and OP2 and encode the number of trailing zeros in these operands. The operation of the encoders is described below in conjunction with FIG. 8.

Then, in a next step 413, the conventional full adder 401 receives the encoded number of trailing zeros in the operand OP1 from the encoder 303 through the port 405. Similarly, the adder 401 receives the number of trailing zeros in the operand OP2 from the encoder 305 through the port 407. Because the maximum number of trailing zeros is fifty-two (which require six bits to represent in binary form), the encoders 303 and 305 provide six-bit output signals to the adder 401. The full adder 401 then generates the sum of trailing zeros of these operands.

In a next step 415, the conventional comparator 403 receives this sum from the full adder 401. The comparator 403 also receives the constant 51 (binary 0110011) through the port 409. The comparator 403 then compares to this sum from the adder 401 with the constant 51. Then in a next step 417, the results of the comparison are analyzed. If the sum is greater than or equal to the constant 51, then in a step 419 the sticky-bit is set to zero. Otherwise, the sticky-bit is set to one in a step 421.

Of course, in other embodiments, different circuitry may be used to implement the encoders and the adder circuit. For example, in one embodiment, the comparator 403 is implemented by subtracting the constant 51 from the sum. Of course, if the result is positive, then the sum of trailing zeros is greater than or equal to the constant 51 and, thus, the sticky-bit is set to zero. If the difference is negative, then the sum of trailing zeros is less than the constant 51 and the sticky-bit is set to one. As is well known, binary subtraction is equivalent to addition of the two's complement of the number to be subtracted. Consequently, the comparator 403 can be implemented with a conventional adder coupled to receive the sum from the adder 401 and the two's complement of the constant 51 (i.e., binary 1001101). The carry-out bit generated by the adder implementing the comparator 403—serves as the sticky-bit, which is a one when the sum is greater than or equal to the constant fifty-one.

Figure 5:
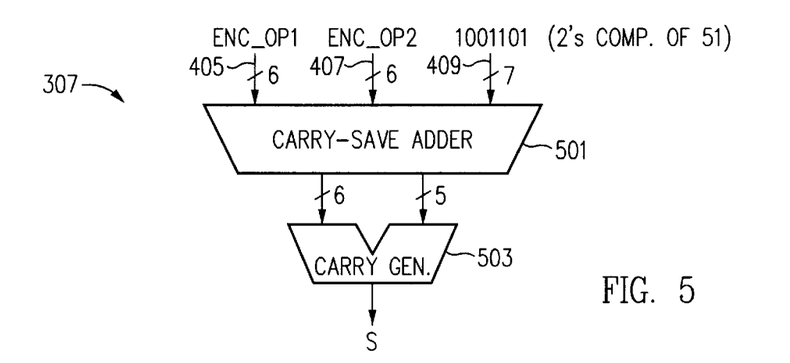
FIG. 5 is a block diagram of an alternative embodiment of an adder circuit, according to the present invention.

FIG. 5 is a block diagram of an alternative embodiment of the adder circuit 307. This embodiment replaces the adder 401 and comparator 403 (FIG. 4) with a conventional carry-save adder 501 and a carry generator 503. In this embodiment, the carry generator 501 is a Brent-Kung carry generator of the type disclosed in "A Regular Layout for Parallel Adders", R. P. Brent and H. T. Kung, IEEE Transactions on Computers, Vol. C-31, No. 3, March 1982, pages 260–264.

The carry-save adder 501 receives the number of trailing zeros from the encoders 303 and 305 (FIG. 4) through the ports 405 and 407, respectively. The carry-save adder 501 also receives the two's complement of the constant 51 (which is seven-bits). The sum and carry output signals of the carry-save adder 501 are then provided to the carry generator 503. This embodiment more efficiently provides the same functionality as the adder circuit depicted in FIG. 4.

In this embodiment, the fifty-two-bit encoders 303 and 305 (FIG. 4) are implemented hierarchically using smaller sized encoders. In particular, a standard four-bit encoder cell is used to implement sixteen-bit encoders. Three of these sixteen-bit encoders are then combined with another four-bit encoder and several multiplexers to form a fifty-two-bit encoder, as described below in conjunction with FIGS. 6 and 7. Of course, in other embodiments, any suitable fifty-two bit encoder can be used that generates the number of trailing zeros of the received operand.

Figures 6, 7:
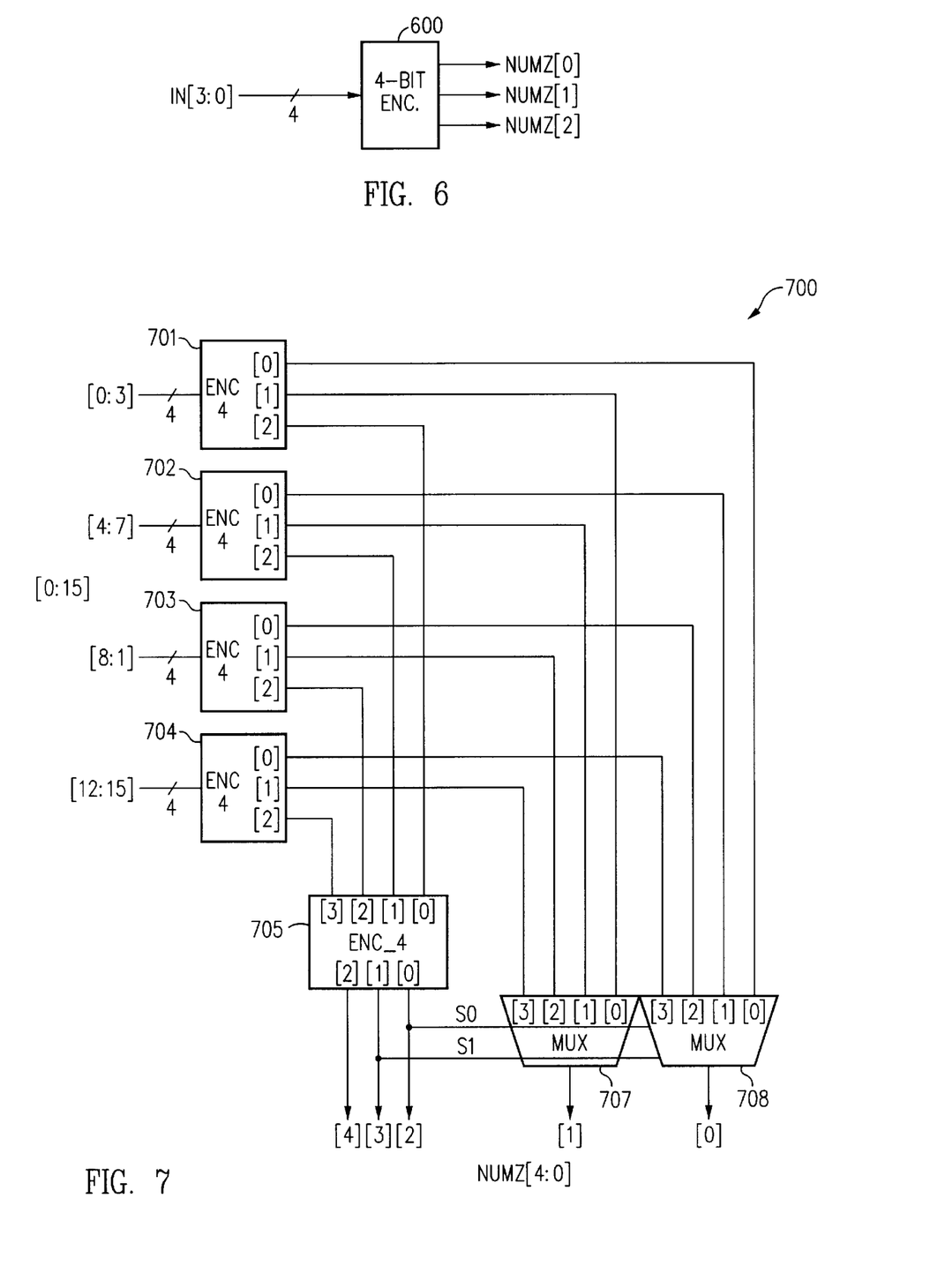
FIG. 6 is a block diagram of a four-bit encoder according to one embodiment of the present invention.
FIG. 7 is a block diagram of a sixteen-bit encoder according to one embodiment of the present invention.

FIG. 6 is a block diagram of a four-bit encoder 600 according to one embodiment of the present invention. The fifty-two-bit encoders 303 and 305 (FIG. 4) may be implemented by interconnecting several four-bit encoders identical to the encoder 600, as described below in conjunction with FIGS. 7 and 8. The four-bit encoder 600 is connected to receive a four-bit input signal in [3:0] to be encoded. Of course, the operands OP1 and OP2 are broken into thirteen four-bit portions that are received by a corresponding four-bit encoder of the fifty-two-bit encoder. The encoder 600 then provides a three-bit output signal numz[2:0] representing the number of trailing zeros in the four bit input signal. Table 1 is a truth table defining the encoder 600. Those skilled in the art of multiplier circuits can easily implement the truth table of Table 1 in a four-bit encoder without undue experimentation.

TABLE 1

| in[3:0] | numz[2:0] |
|---------|-----------|
| XXX1    | 100       |
| XX10    | 101       |
| X100    | 110       |
| 1000    | 111       |
| 0000    | 000       |

One way of viewing this encoding scheme is that the number of trailing zeros of the four-bit input signal in[3:0] are first generated, with the most significant numz bit being inverted. As a result, the bit numz[2] will indicate whether a "1" occurs in the four received bits in[3:0]. The number of trailing zeros in the received four-bit input signal is then generated by inverting the most significant bit (i.e., numz[2] for a four-bit encoder) for a second time. However, this coding scheme allows up to four of these four-bit encoders to be combined into a larger encoder, as described below in conjunction with FIG. 7. This modular implementation of the encoder represents a balance between the size of the encoder and the speed.

FIG. 7 is a block diagram of a sixteen-bit encoder 700 according to one embodiment of the present invention. The encoder 700 includes five four-bit encoders 701–705 and two four-input multiplexers 707 and 708. The four-bit encoders 701–705 are substantially identical to the encoder 600 (FIG. 6). The encoder 700 is interconnected as follows.

The encoder 701 is connected to receive the bits in[3:0] and encode these received bits in accordance with Table 1. The bit numz[0] generated by the encoder 701 is provided to the "zero"-input lead of the multiplexer 708 (i.e., the input lead selected when the select signals received by the multiplexer represent a zero). The bit numz[1] generated by the encoder 701 is provided to the "zero"-input lead of the multiplexer 707, and the bit numz[2] generated by the encoder 701 is provided to the in[0] lead of the encoder 705.

Similarly, the encoder 702 is connected to receive the bits in[4:7]. The encoder 702 then generates the bits numz[0], numz[1] and numz[2], which are then provided to the "one"-input lead of the multiplexer 708, the "one"-input lead of the multiplexer 707 and the in[1] lead of the encoder 705, respectively. Likewise, the encoder 703 is connected to receive the bits in[8:11]. The encoder 703 generates and provides the bits numz[0], numz[1] and numz[2] to the "two"-input lead of the multiplexer 708, the "two"-input lead of the multiplexer 707 and the in[2] lead of the encoder 705, respectively. In a similar manner, the encoder 704 is connected to receive the bits in[12:15] and generate the bits numz[0], numz[1] and numz[2] in accordance with Table 1. The encoder 704 respectively provides the bits numz[0], numz[1] and numz[2] to the "three"-input lead of the multiplexer 708, the "three"-input lead of the multiplexer 707 and the in[3] lead of the encoder 705.

The encoder 705, as stated above, is connected to receive the numz[2] bits of the encoders 701–704, which the encoder 705 then encodes according to Table 1. The encoder 705 provides its numz[0] output signal to the s0 lead of the multiplexers 707 and 708. Similarly, the encoder 705 provides its numz[1] output signal to the s1 leads of the multiplexers 707 and 708.

The multiplexers 707 and 708 respond to the signals on the s0 and s1 leads to select the signal received on the indicated multiplexer input lead. For example, if the signals on the s0 and s1 leads form a binary "1", then the multiplexers select the signal received on the multiplexers' "one"-input leads. Likewise, if the signals on the s0 and s1 leads form a binary "3", then the multiplexers select the signals received on the multiplexers' "three"-input leads.

In addition, the numz[1:0] bits generated by the encoder 705 serve as the numz[3:2] bits of the sixteen-bit encoder 700. The numz[2] bit generated by the encoder 705 serves as the numz[4] bit of the sixteen-bit encoder 700. Accordingly, the sixteen-bit encoder 700 receives a sixteen bit input signal and generates an encoded five-bit output signal indicating the number of trailing zeros.

In operation, each of the four-bit encoders 701–704 receive the encoder's corresponding four-bit portion of the sixteen-bit input signal and provide the encoded number of trailing zeros in that four-bit portion to the encoder 705 and the multiplexers 707 and 708. The encoder 705 then encodes the numz[2] output bits of the encoders 701–704. Because each numz[2] bit generated by the four-bit encoders 701–704 indicate whether a "1" occurs in the corresponding received four-bit portion, encoding the numz[2] bits will indicate how to combine the number of trailing zeros in the four four-bit portions. If a numz[2] bit of a particular encoder is a "1" then none of the trailing zeros of the higher order four-bit portions may be combined with the trailing zeros of this particular encoder. However, if the numz[2] is a "0", then the trailing zeros of the next higher order four-bit portion may be combined with the trailing zeros of this particular encoder. It is appreciated that in this scheme, for each encoder(s) having a "lower order" than the selected encoder, a binary four is added to the output signal of the sixteen-bit encoder 700. In particular, the number of trailing zeros represented by the output signal of the encoder 705 indicates the number of times a binary four is added to the number of trailing zeros represented by the selected four-bit encoder's output signal. Table 2 is a truth table defining the sixteen-bit encoder 700.

TABLE 2

| in[15:0] | numz[5:0] |
|---|---|
| XXXXXXXXXXXXXXX1 | 10000 |
| XXXXXXXXXXXXXX10 | 10001 |
| XXXXXXXXXXXXX100 | 10010 |
| XXXXXXXXXXXX1000 | 10011 |
| XXXXXXXXXXX10000 | 10100 |
| ... | ... |
| X100000000000000 | 11110 |

TABLE 2-continued

| in[15:0] | numz[5:0] |
|---|---|
| 1000000000000000 | 11111 |
| 0000000000000000 | 00000 |

For example, if the bits in[3:0] are all zeros, then the encoder 701 outputs the bits numz[2:0] as a binary "000", according to Table 1. However, if the bits in[7:4] have only two trailing zeros, the encoder 702 outputs a binary "110" in accordance with Table 1 (resulting in a total of six trailing zeros for the sixteen bit input signal). As a result, the encoder 705 receives a "0" as its in[0] bit and a "1" as its in[1] bit. Consequently, the encoder 705 will output a binary "101" as its numz[3:0] output signal, in accordance with Table 1. These bits generated by the encoder 705 serve as the numz[4:2] bits of the sixteen-bit encoder 700. As described above, the bit numz[3] generated by the encoder 705 indicates whether a "1" has occurred in this particular sixteen-bit input signal in[15:0].

Because the encoder 705 outputs a binary "101", the multiplexers 707 and 708 receive the select signals s0 and s1 as binary "01". Thus, the multiplexers 707 and 708 select the numz[1:0] bits from the encoder 702, resulting in one "lower order" encoder (i.e., encoder 701 ). As described above, the numz[1:0] bits generated by the encoder 702 are binary "10". These bits serve as the numz[1:0] bits generated by the sixteen-bit encoder 700. As stated above, the three-bit output signal generated by the encoder 705 also serves as the bits numz[4:2] of the sixteen-bit encoder 700. Thus, the sixteen-bit encoder 700 generates a binary "10110". Because of the encoding scheme (which inverts the most significant bit of the encoder output signal), by inverting the most significant bit of this five-bit output signal, the number of trailing zeros is indicated as binary "00110" (i.e., decimal six). Of course, the most significant bit numz[4] generated by the sixteen-bit encoder 700 is not inverted when the encoder 700 is combined with other similar encoders to form a larger encoder, as described below in conjunction with FIG. 8.

In the case where all sixteen bits of the input signal in[15:0] are zero, then all of the four-bit encoders 701–704 will output binary "000". As a result, the encoder 705 will also receive all zeros and, therefore, will output binary "000" as the numz[4:2] bits of the sixteen-bit encoder 700. In addition, the select signals s0 and s1 also have "0" values, which will cause the multiplexers to select the signals received at the multiplexers' "zero"-input leads. Accordingly, the sixteen-bit encoder 700 will generate the output signal numz[4:0] as binary "00000". Inverting the most significant bit numz[4] results in the number of trailing zeros in the input signal in [15:0] being binary "10000", which is decimal sixteen.

Figure 8:
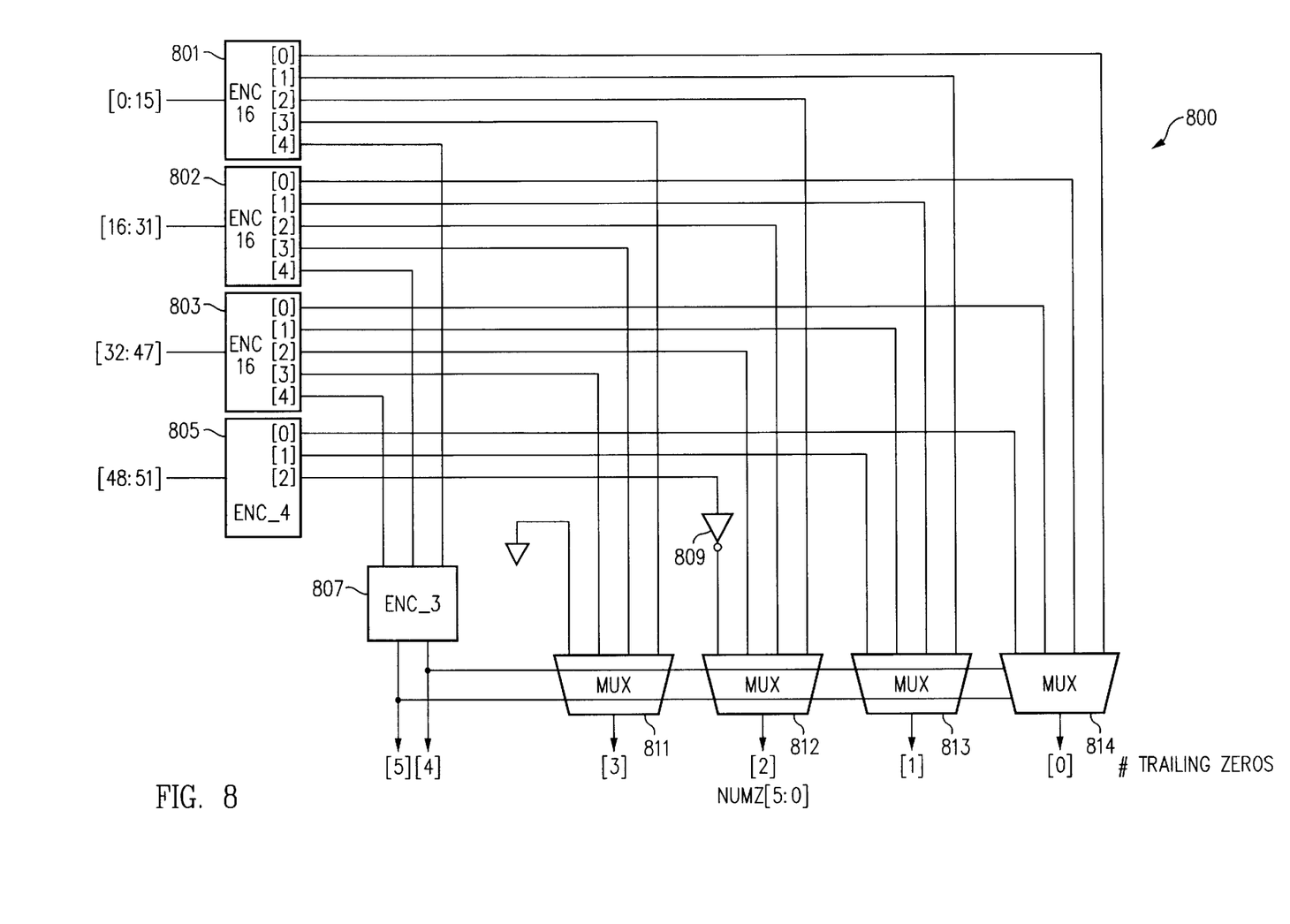
FIG. 8 is a block diagram of a fifty-two-bit encoder according to one embodiment of the present invention.

FIG. 8 is a block diagram of a fifty-two-bit encoder 800 according to one embodiment of the present invention. The fifty-two-bit encoder 800 includes three sixteen-bit encoders 801–803, a four-bit encoder 805, a three-bit encoder 807, an inverter 809 and four four-input multiplexers 811–814. The sixteen-bit multiplexers 801–803 are substantially identical to the encoder 700 (FIG. 7) and the four-bit encoder 805 is substantially similar to the encoder 600 (FIG. 6). The three-bit encoder 807 can be implemented with a four-bit encoder having its in[3] input lead connected to receive a "1".

The fifty-two-bit encoder 800 is interconnected as follows. The sixteen-bit encoder 801 is connected to receive the bits in[15:0] and encode these received bits as described above for encoder 700 in conjunction with FIG. 7. The bit numz[0] generated by the encoder 801 is provided to the "zero"-input lead of the multiplexer 814. The bit numz[1] generated by the sixteen-bit encoder 801 is provided to the "zero"-input lead of the multiplexer 813, the bit numz[2] generated by the sixteen-bit encoder 801 is provided to the "zero"-input lead of the multiplexer 812, the bit numz[3] generated by the sixteen-bit encoder 801 is provided to the in[0] lead of the multiplexer 811, and the bit numz[4] generated by the sixteen-bit encoder 801 is provided to the in[0] lead of the three-bit encoder 807.

Similarly, the sixteen-bit encoder 802 is connected to receive the bits in[31:16]. The sixteen-bit encoder 802 then generates the bits numz[0], numz[1], numz[2], numz[3] and numz[4] which are then provided to the "one"-input lead of the multiplexer 814, the "one"-input lead of the multiplexer 813, the "one"-input lead of the multiplexer 812, the "one"-input lead of the multiplexer 811, and the in[1] lead of the three-bit encoder 807, respectively. Likewise, the sixteen-bit encoder 803 is connected to receive the bits in[47:32]. The encoder 803 generates and provides its output bits numz[0], numz[1], numz[2], numz[3] and numz[4] to the "two"-input lead of the multiplexer 814, the "two"-input lead of the multiplexer 813, the "two"-input lead of the multiplexer 812, the "two"-input lead of the multiplexer 811, and the in[2] lead of the three-bit encoder 807, respectively.

In a similar manner, the four-bit encoder 804 is connected to receive the bits in[51:48] and generate its output bits numz[0], numz[1], and numz[2], which are then provided to the "three"-input lead of the multiplexer 814, the "three"-input lead of the multiplexer 813, and the "three"-input lead of the multiplexer 812 through the inverter 809, respectively. The "three"-input lead of the multiplexer 811 is connected to receive a "0" by connection to a ground source.

The encoder 807, as stated above, is connected to receive the numz[4] bits of the encoders 801–803, which the encoder 807 then encodes to generate in binary form the number of trailing zero in the received input signal. Because only three input signals are received, the three-bit encoder 807 only outputs a two-bit output signal, which is sufficient to indicate the number of trailing zeros of the received bits in[48:51]. The encoder 807 provides its numz[0] output signal to the s0 lead of the multiplexers 811–814. Similarly, the encoder 807 provides its numz[1] output signal to the s1 leads of the multiplexers 811–814.

In operation, each of the sixteen-bit encoders 801–803 receive the encoder's corresponding sixteen-bit portion of the fifty-two-bit input signal in[51:0] and provide the encoded number of trailing zeros in that sixteen-bit portion to the encoder 807 and the multiplexers 811–814, as described above for sixteen-bit encoder 700 (FIG. 7). In addition, the four-bit encoder 805 receives its corresponding four-bit portion of the input signal in[51:0] and provides the encoded number of trailing zeros in that four-bit portion to the multiplexers 812–814. Further, the numz[2] output signal generated by the four-bit encoder 805 is inverted by the inverter 809 before being received by the multiplexer 812. This inversion is performed because the four-bit encoder 805 is not combined with an additional encoder. Thus, as described above in conjunction with FIG. 6, the most significant encoded bit of the four-bit encoder is inverted for a second time to generate the actual (as opposed to encoded) number of trailing zeros.

The encoder 807 then encodes the numz[4] output bits of the encoders 801–803. Because each numz[4] bit generated by the sixteen-bit encoders 801–803 indicate whether a "1" occurs in the corresponding received sixteen-bit portion, encoding the numz[4] bits will indicate how to combine the number of trailing zeros in the three sixteen-bit portions. If a numz[4] bit of a particular encoder is a "1" then none of the trailing zeros of the higher order sixteen-bit portions may be combined with the trailing zeros of this particular encoder. However, if the numz[4] is a "0", then the trailing zeros of the next higher order sixteen-bit portion may be combined with the trailing zeros of this particular encoder. The three-bit encoder 807 implements this scheme by providing the select signals s0 and s1 to the multiplexers 811–814 to select the output signal of the encoder having the lowest order "1". The multiplexers 811–814 then provide the selected encoder output signal as the bits numz[3:0] of the fifty-two-bit encoder 800. The output signals of the encoder 807 serve as the numz[5:4] bits of the fifty-two-bit encoder 800. It is appreciated that in this scheme, for each encoder(s) having a "lower order" than the selected encoder, a binary sixteen is added to the output signal of the fifty-two-bit encoder 800. In particular, the number of trailing zeros represented by the output signal of the encoder 807 indicates the number of times a binary sixteen is added to the number of trailing zeros represented by the selected sixteen-bit encoder's output signal.

For example, if the bits in[46:0] are all zeros and the bit in[47] is a one (i.e., for a total of forty-seven trailing zeros), then the encoders 801 and 802 output all zeros as described above for the sixteen-bit encoder 700 (FIG. 7). In addition, the encoder 803 will output a binary "11111". As a result, the encoder 807 will necessarily output a binary "10", thereby causing the multiplexers 811–814 to select the output signals generated by the sixteen-bit encoder 803. Accordingly, the numz[5:0] output signal generated by the fifty-two-bit encoder 800 is binary "101111" (i.e., decimal forty-seven).

Note that if the bits in[50:0] are all zero while the bit in[51] is a one (i.e., for a total of fifty-one trailing zeros), then the sixteen-bit encoders 801–803 output all zeros in accordance with Table 2. The four-bit encoder 805 outputs a binary "111" in accordance with Table 1 because the encoder 805 receives three trailing zeros. In addition the zeros for the numz[4] output bits generated by the encoders 801–803 cause the three-bit encoder 807 to generate the numz[5:4] bits of the fifty-two-bit encoder 800 (and, thus, the select signals s0 and s1) to be a binary "11". The binary "11" values of the select signals s0 and s1 cause the multiplexers 811–814 to select the "three"-input leads of the multiplexers 811–814. Thus, the multiplexers 812–814 select the numz[2:0] output bits generated by the four-bit encoder 805, which then serve as the output bits numz[2:0] of the fifty-two-bit encoder 800. Because the four-bit encoder 805 is the "highest order" encoder, the numz[2] bit is inverted through the inverter 809 before being received by the multiplexer 812 and, thus, the numz[2:0] bits are binary "010". The "three"-input lead of the multiplexer 811 is connected to receive a "0" by being connected to a ground source, causing the numz[3] bit generated by the encoder 800 to be a zero. Accordingly, the fifty-two-bit encoder 800 generates a binary "110011" (i.e., decimal fifty-one).

Figure 9:
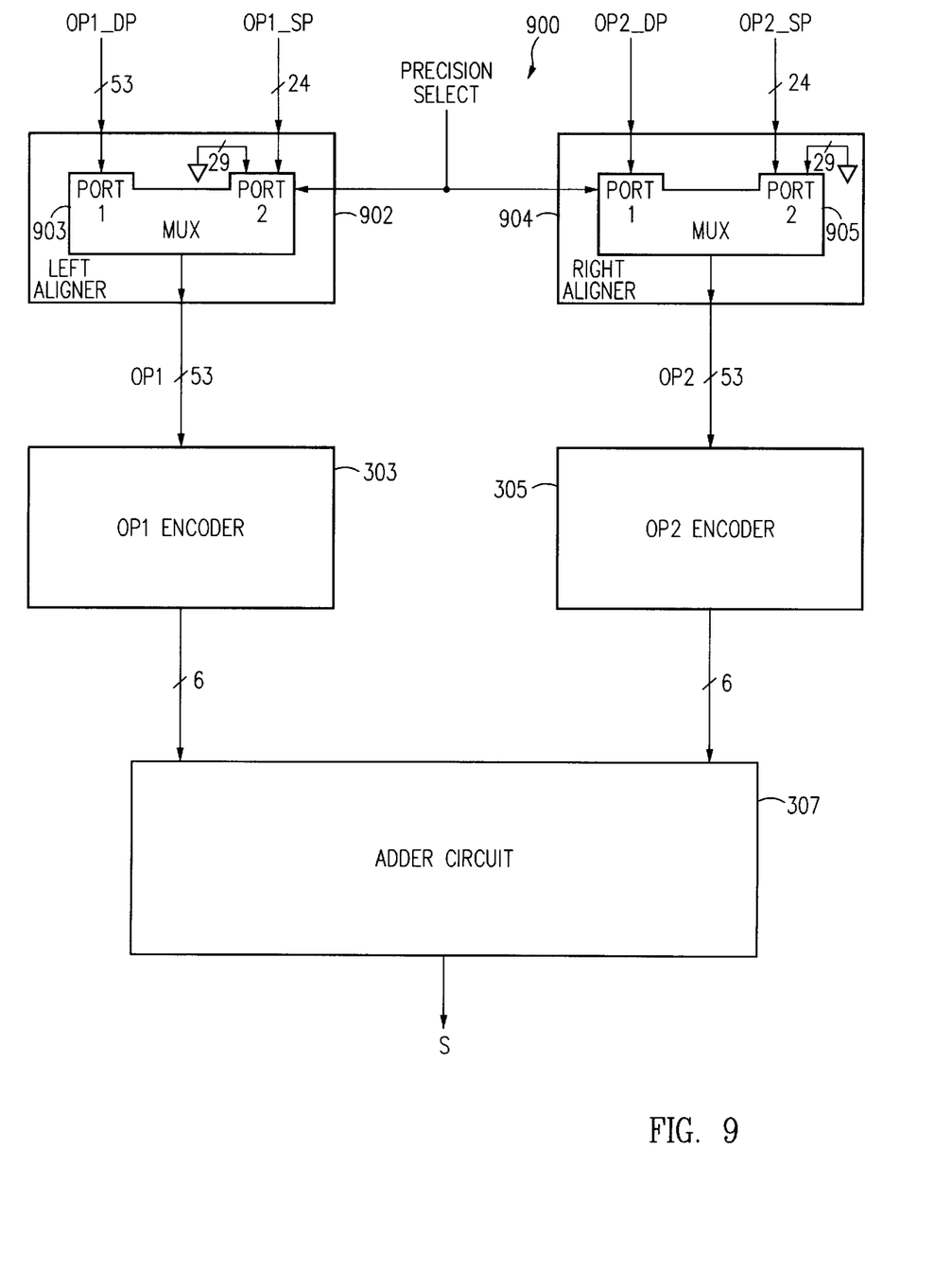
FIG. 9 is a block diagram of a single precision sticky-bit detection circuit according to one embodiment of the present invention.

FIG. 9 is a functional block diagram of a single precision sticky-bit detection circuit 900 using the same hardware for double precision multiplication, according to one embodiment of the present invention. In this embodiment, the single precision multiplication operation is a twenty-four-bit [23:0] by twenty-four-bit [23:0] multiplication, generating in a forty-eight-bit result [47:0]. The sticky-bit is then defined as the logical-OR of the lower order twenty-two bits [21:0], with the round bit being bit[23]. Using the same concept as for double precision multiplication, the number of trailing zeros of the first operand would be added to the number of trailing zeros of the second operand and then compared to the constant twenty-two.

However, in this embodiment, the sticky-bit detection circuit 900 uses the same hardware used in the double precision fifty-three-bit by fifty-three-bit multiplication operation described above in conjunction with FIGS. 3 and 4. The sticky-bit detection circuit 900 includes a left aligner 902, a right aligner 904, the fifty-bit encoders 303 and 305, and the adder circuit 309. In this embodiment, the left and right aligners are multiplexers 903, 905 each having two input ports coupled to the operand buses. A first input port of each multiplexer 903, 905 is coupled to receive all fifty-three bits OP1_DP and OP2_DP, respectively, of the operand (for double precision operations) whereas the second input port of each multiplexer is coupled to receive the lower order twenty-four bits OP1_SP and OP2_SP, respectively, of the operand bus (for single precision operations). In particular, in the right aligner, the twenty-four lower order bits from the OP2 operand bus is connected to the twenty-four lower order bits of the second input port, with the twenty-nine higher order bits being filled with leading zeros. Conversely, in the left aligner, the twenty-four lower order bits from the OP1 operand bus is connected to the twenty-four higher order bits of the second input port, with the twenty-nine lower order bits are filled with zeros. The multiplexers are controlled in the conventional manner to select the first input ports during double precision modes and to select the second input ports during single precision modes. The adder circuit 307 and the encoders 303 and 305 are of the same type as described above in conjunction with FIGS. 4 and 5.

Figure 10:
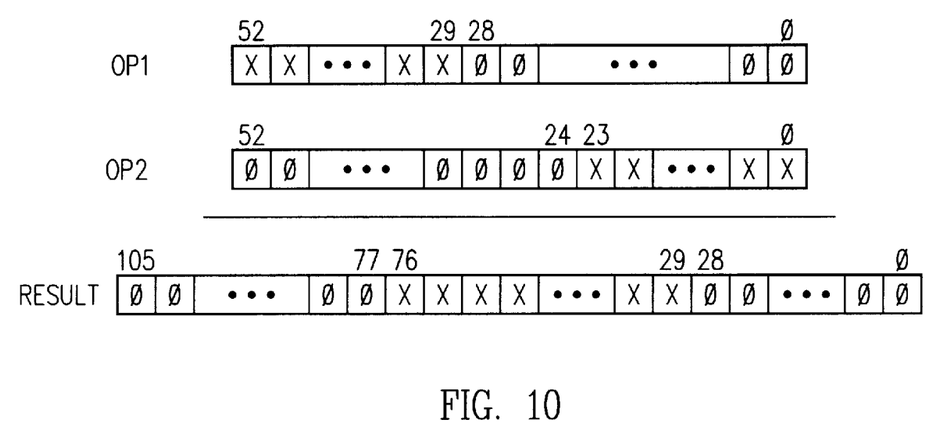
FIG. 10 is a diagram illustrative of the operands and result of a multiplication operation using the circuit of FIG. 9.

FIG. 10 is a diagram showing the alignment of bits in the operands OP1 and OP2, after alignment by the aligners 902 and 903. The operand OP1_sp is a twenty-four bit operand that is left aligned with trailing zeros filling the twenty-nine lower order bits by the aligner 902 to form the operand OP1. Similarly, the aligner 904 right aligns the single precision twenty-four bit operand OP2_sp with the twenty-nine higher order bits being filled with leading zeros to form operand OP2. Consequently, the aligned operands OP1 and OP2 generated by the aligners 902 and 904 are fifty-three-bit operands, which can then be processed by the double precision hardware described above in conjunction with FIGS. 3 and 4.

Thus, the encoders 303 and 305 then generate a six-bit encoded binary number representing the number of trailing zeros of the fifty-two higher order bits of each operand OP1 and OP2, as described above in the double precision embodiments. The six-bit encoded numbers are then received by the adder circuit 307, which generates the sum of the trailing zeros of the operands and compares this sum to the constant fifty-one. This hardware correctly generates the single precision sticky-bit because the sum of the lower order twenty-two bits of the multiplication result and the twenty-nine trailing zeros inserted in the operand OP1 is fifty-one. Referring to FIG. 9A, the bits[28:0] of the result are all zeros due to the twenty-nine trailing zeros (i.e., bits[28:0]) of the operand OP1. The leading bits[105:77] of the result are all zeros due to the twenty-nine leading zeros of the operand OP2. Thus, the bits[76:29] represent the multiplication result of the twenty-four-bit single precision operands OP1_sp and OP2_sp. Thus, only when the twenty-two lower order bits of the result are all zeros will the sticky-bit be zero, complying with the definition of the single precision sticky-bit.

Figure 11:
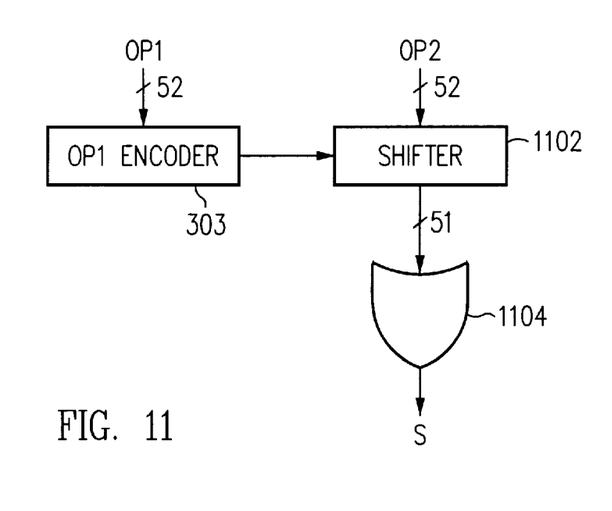
FIG. 11 is a block diagram of a sticky-bit detection circuit according to another embodiment of the present invention.

FIG. 11 is a block diagram of a sticky-bit detection circuit 1100 according to another embodiment of the present invention. The sticky-bit detection circuit 1100 includes the fifty-two-bit encoder 303, a shifter 1102 and a fifty-one-input OR gate 1104. The encoder 303 is connected to receive the operand OP1 as described above (FIG. 4) and is connected to provide its encoded output signal to the shifter 1102. The shifter 1102 is a conventional fifty-two shifter, also connected to receive and store the operand OP2. The shifter 1102 then left-shifts the stored operand OP2 by the number of trailing zeros generated by the encoder 303, filling the lower order bits with trailing zeros. Thus, after shifting, the value stored in the shifter 1102 is represents the operand OP2 with trailing zeros, if any, of the operand OP1 tagged onto the least significant end of the operand OP2. The fifty-one-input OR gate 1004 then performs the logical OR operation on the lower order fifty-one-bits of the value stored in the shifter 1102. As a result, if the sum of trailing zeros of the operands OP1 and OP2 are greater than or equal to fifty-one, the OR gate 1104 outputs a zero as the sticky-bit; otherwise, the OR gate 1104 outputs a one as the sticky-bit, conforming to the definition of the sticky-bit.

The embodiments of the sticky-bit circuit and methodology described above are illustrative of the principles of this invention and are not intended to limit the invention to the particular embodiments described. For example, those skilled in the art of multiplier circuits can design embodiments with different encoders than those described herein. Of course, in light of the present disclosure, other embodiments of the sticky-bit circuit may be adapted without undue experimentation for multipliers of different bit sizes in addition to the fifty-three bit-by-fifty-three bit and twenty-four bit-by-twenty-four bit multipliers described. Accordingly, while the preferred embodiment of the invention has been illustrated and described, it is appreciated that in view of the present disclosure, various changes can be made therein without departing from the spirit and scope of the invention.

The the embodiments of the invention in which an exclusive property or privilege is claimed are defined as follows:

1. A method for generating a sticky-bit of a multiplication operation of first and second operands comprising:

receiving a first sixteen bits of said first operand by an input port of a first sixteen-bit encoder wherein said first sixteen-bit encoder includes first, second, third, fourth and fifth output terminals;

receiving a second sixteen bits of said first operand by an input port of a second sixteen-bit encoder wherein said second sixteen-bit encoder includes first, second, third, fourth and fifth output terminals;

receiving a third sixteen bits of said first operand by an input port of a third sixteen-bit encoder wherein said third sixteen-bit encoder includes first, second, third, fourth and fifth output terminals;

receiving a last four bits of said first operand by an input port of a four-bit encoder wherein said four-bit encoder includes first, second, and third output terminals;

receiving a signal on a first input lead of a first multiplexer from said first output terminal of said first sixteen-bit encoder;

receiving a signal on a second input lead of said first multiplexer from said first output terminal of said second sixteen-bit encoder;

receiving a signal on a third input lead of said first multiplexer from said first output terminal of said third sixteen-bit encoder;

receiving a signal on a fourth input lead of a first multiplexer from said first output terminal of said four-bit encoder wherein said first multiplexer includes an output line;

receiving a signal on a first input lead of a second multiplexer from said second output terminal of said first sixteen-bit encoder;

receiving a signal on a second input lead of said second multiplexer from said second output terminal of said second sixteen-bit encoder;

receiving a signal on a third input lead of said second multiplexer from said second output terminal of said third sixteen-bit encoder;

receiving a signal on a fourth input lead of a first multiplexer from said second output terminal of said four-bit encoder wherein said second multiplexer includes an output line;

receiving a signal on an input terminal of an inverter from said third output terminal of said four-bit encoder;

receiving a signal on a first input lead of a third multiplexer from said third output terminal of said first sixteen-bit encoder;

receiving a signal on a second input lead of said third multiplexer from said third output terminal of said second sixteen-bit encoder;

receiving a signal on a third input lead of said third multiplexer from said third output terminal of said third sixteen-bit encoder;

receiving a signal on a fourth input lead of a first multiplexer from an output terminal of said inverter wherein said third multiplexer includes an output line;

receiving a signal on a first input lead of a fourth multiplexer from said fourth output terminal of said first sixteen-bit encoder;

receiving a signal on a second input lead of said fourth multiplexer from said fourth output terminal of said second sixteen-bit encoder;

receiving a signal on a third input lead of said fourth multiplexer from said fourth output terminal of said third sixteen-bit encoder wherein said fourth multiplexer includes an output line;

receiving a signal on a first input lead of a three-bit encoder from said fifth output terminal of said first sixteen-bit encoder;

receiving a signal on a second input lead of said three-bit encoder from said fifth output terminal of said second sixteen-bit encoder;

receiving a signal on a third input lead of said three-bit encoder from said fifth output terminal of said third sixteen-bit encoder;

receiving on first output select terminals of said first, second, third, and fourth multiplexers a signal from a first output lead of said three-bit encoder;

receiving on second output select terminals of said first, second, third, and fourth multiplexers a signal from a second output lead of said three-bit encoder;

wherein a first encoded value of a number of trailing zeros in the first operand is generated on said output lines of said first, second, third, and fourth multiplexers, and said first and second output leads of said three-bit encoder;

receiving said second operand on an input port of a second encoder having a plurality of output lines wherein, in response to said second operand, said second encoder generates, on said plurality of output lines, a second encoded value of a number of trailing zeros in the second operand;

receiving said first encoded value by a first input port of an adder circuit;

receiving said second encoded value by a second input port of said adder circuit, wherein said adder circuit generates a sum of said first and second encoded values, compares said sum to a predetermined constant, and generates said sticky-bit.

2. A method for generating a sticky-bit of a multiplication operation for both single precision and double precision operands comprising:

receiving data from a first m-bit double precision operand bus by a first m-bit input port of a left aligner circuit;

receiving data from a first n-bit single precision operand bus by a second m-bit input port of said left-aligner circuit wherein an n most significant bits of said second m-bit input port are connected to said first n-bit single precision operand bus;

wherein said left aligner circuit includes a m-bit output port; and in a single precision mode of operation, said left aligner circuit aligns said data on said n most significant bits of said second m-bit input port with an n most significant bit of said m-bit output port and drives a zero on a (m-n) least significant bits of said m-bit output port; and in a double precision mode of operation, said left aligner circuit passes data from said first m-bit input port to said m-bit output port; and receiving data from a second m-bit double precision operand bus by a first m-bit input port of a right aligner circuit;

receiving data from a second n-bit single precision operand bus by a second m-bit input port of said right-aligner circuit wherein an n least significant bits of said second m-bit input port are connected to said second n-bit single precision operand bus;

wherein said right aligner circuit includes a m-bit output port;

in a single precision mode of operation, said right aligner circuit aligns data on said n least significant bits of said second m-bit input port with an n least significant bits of said m-bit output port and drives a zero a (m-n) most significant bits of said m-bit output port; and in a double precision mode of operation, said right aligner circuit passes data from said first m-bit input port to said m-bit output port;

receiving a first m-bit operand from said m-bit output port of said left aligner circuit by an input port of a first m-bit encoder wherein said first m-bit encoder includes an output port and said first m-bit encoder generates a first encoded value of a number of trailing zeros in said first m-bit operand;

receiving a second m-bit operand from said m-bit output port of said right aligner circuit by an input port of a second m-bit encoder wherein said second m-bit encoder includes an output port and said second m-bit encoder generates a second encoded value of a number of trailing zeros in said second m-bit operand;

receiving said first encoded value by a first input port of an adder circuit; and receiving said second encoded value by a second input port of said adder circuit wherein said adder circuit generates a sum of said first and second encoded values, compares said sum to a predetermined constant, and generates a stick-bit on a sticky-bit output line.

* * * * *

UNITED STATES PATENT AND TRADEMARK OFFICE
CERTIFICATE OF CORRECTION

PATENT NO. : 6,044,391
DATED : March 28, 2000
INVENTOR(S) : Chin-Chieh Chao and Paul Jeffs It is certified that error appears in the above-identified patent and that said Letters Patent is hereby corrected as shown below:

Column 14,
Line 26, delete "and".

Signed and Sealed this

Twenty-first Day of May, 2002

Attest:

JAMES E. ROGAN
Attesting Officer     Director of the United States Patent and Trademark Office